June 11, 1929.  W. VERNET ET AL  1,717,175
EQUALIZER FOR SHOCK ABSORBERS
Filed Oct. 7, 1924   3 Sheets-Sheet 1
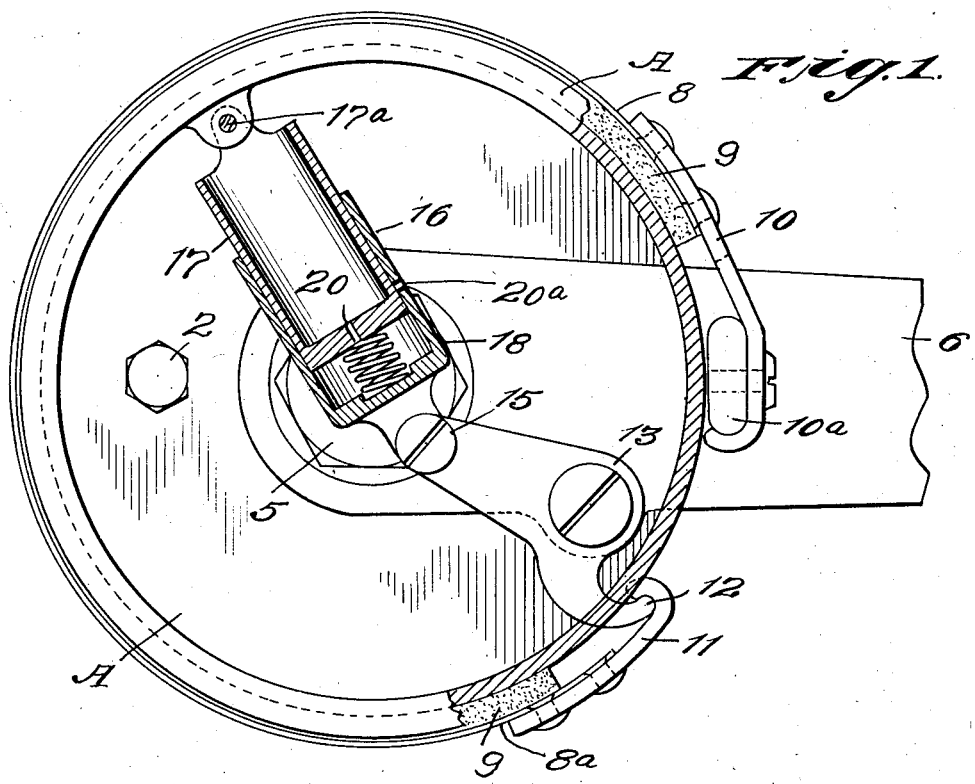
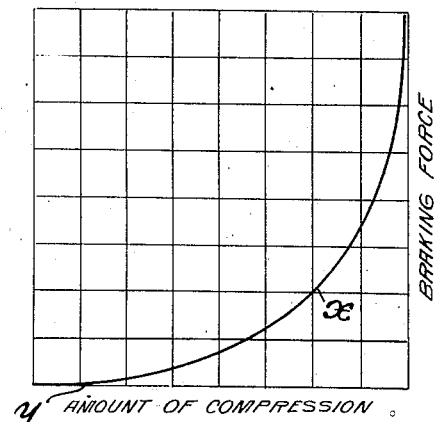
INVENTORS
WALDEMAR VERNET &
SERGIUS VERNET
BY William P. Hammond
ATTORNEY June 11, 1929.   W. VERNET ET AL   1,717,175
EQUALIZER FOR SHOCK ABSORBERS
Filed Oct. 7, 1924   3 Sheets-Sheet 2
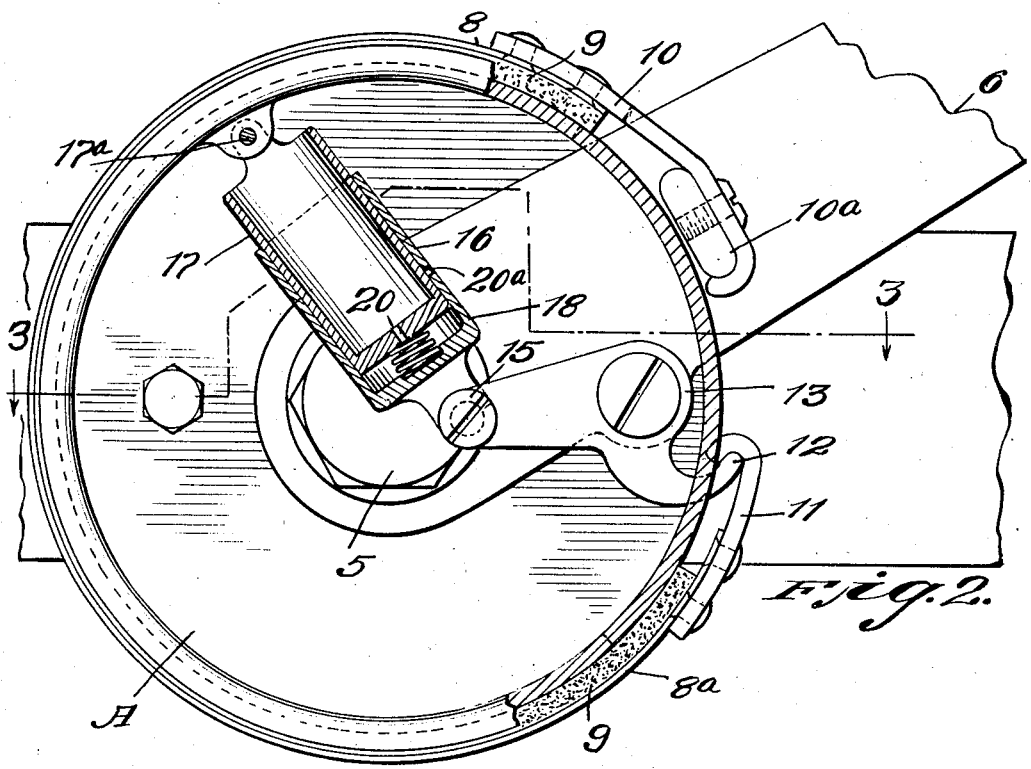
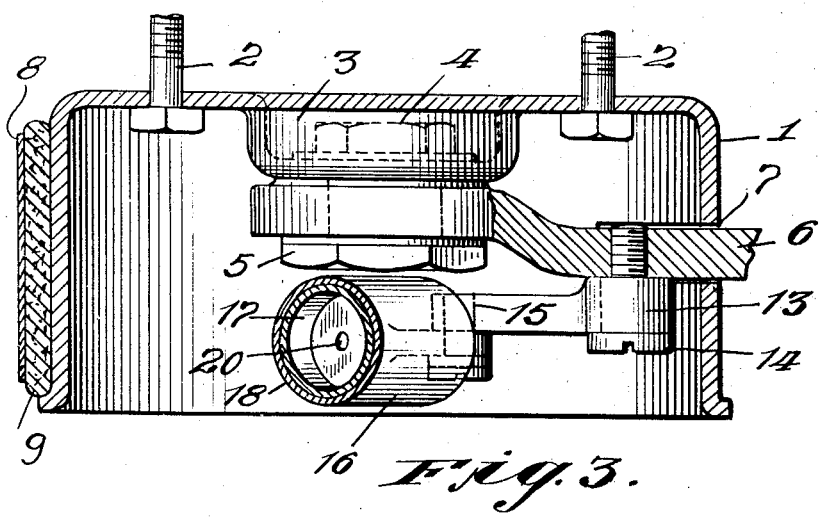
INVENTORS
WALDEMAR VERNET &
SERGIUS VERNET
BY William P. Hammond
ATTORNEY

Patented June 11, 1929.

1,717,175

UNITED STATES PATENT OFFICE.

WALDEMAR VERNET, OF NEW YORK, AND SERGIUS VERNET, OF BROOKLYN, NEW YORK.

EQUALIZER FOR SHOCK ABSORBERS.

Application filed October 7, 1924. Serial No. 742,127.

This invention relates to an improvement in shock absorbers for softening and snubbing the compression and rebound of vehicle springs when the vehicle is passing over rough ground.

It is the object of the invention to provide an equalizer for shock absorbers of various types which will automatically equalize and adjust the action of the shock absorber to the action of the springs in accordance with the nature of the road being traversed, the speed of the vehicle, the variations in the load on the vehicle and the variation in the strength of the springs due to wear.

It is a feature of the invention that by adding the equalizer to the various types of shock absorbers heretofore known, they are caused to so control the spring action under almost all operating conditions so as to give correct aiding qualities to the vehicle regardless of the nature of the road being traversed, the speed of the vehicle or differences in the weight of the contents of the vehicle.

Another object of the invention is to provide an equalizer for shock absorbers which will permit freedom of spring action when the vehicles are on substantially smooth roads, but will check or damp excessive movement of the vehicle body relative to its running gears on the compression and rebound or if preferred on the rebound only of the springs when the vehicle is travelling over rough roads, the degree of checking being proportioned to the amount of compression of the springs and the suddenness of the rebound.

Another object of the invention is to provide an equalizer for shock absorbers which will automatically permit the shock absorber to adjust itself to variations in the weight of the vehicle body and contents and to the normal relation of the vehicle body and running gears so as to give correct riding qualities, in accordance with the variation of the weight of the vehicle body and contents.

Another object of the invention is to provide an equalizing shock absorber having the above enumerated properties which can be formed of relatively few rugged parts easy to manufacture and unlikely to get out of order.

Various other objects and advantages will appear as the description of the invention proceeds.

Fig. 1 is a part sectional side view of one form of shock absorber, with my equalizer applied thereto, in its normal position.

Fig. 2 is a similar view showing the approximate position of the shock absorber when the springs are fully compressed.

Fig. 3 is a sectional view on the line 3—3 of Figure 2.

Fig. 4 is a diagram illustrating the braking or damping action of the shock absorber on the compression movement of the vehicle springs.

Figure 5:
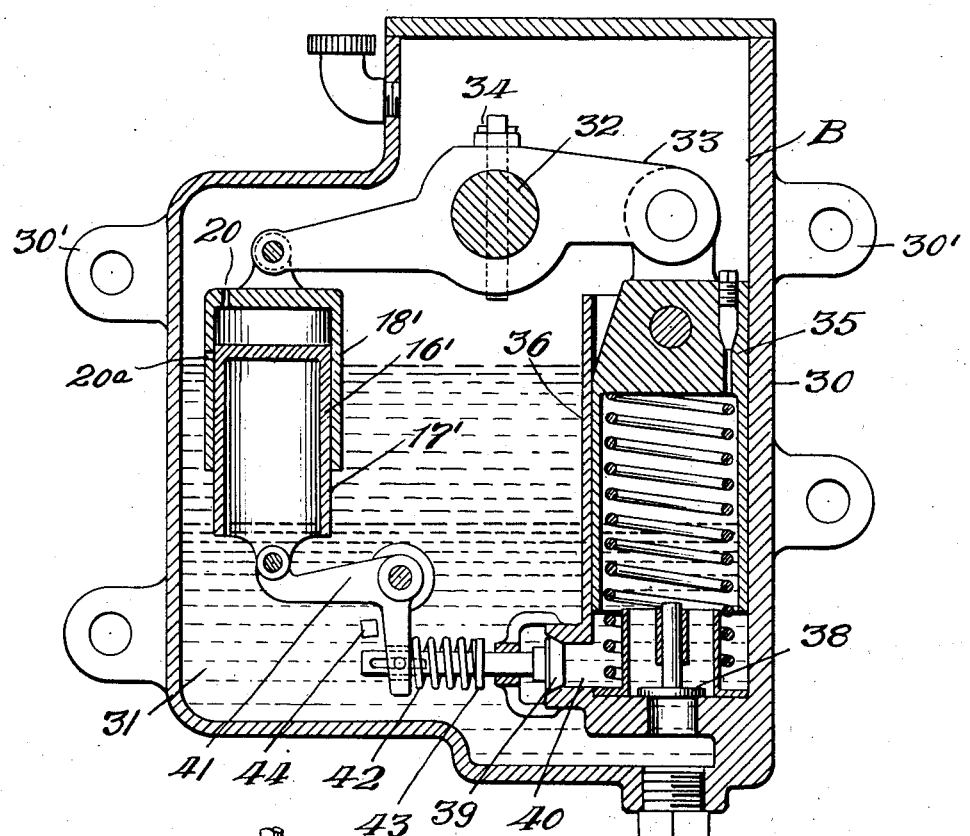
Fig. 5 is a sectional view of another form of shock absorber with the equalizer added thereto.

In the embodiment shown in Figure 1 the equalizer is shown as applied to a shock absorber A comprising a drum member 1 adapted to be secured to the chassis of the vehicle by means of bolts or the like 2. A section 3 at the center of the closed side of the drum is pressed inward to form a depression for receiving the nut 4, for holding the stud bolt 5 upon which a brake arm 6 is pivoted.

The brake arm 6 projects through a slot 7 in the wall of the drum 1 and is secured by means of a rigid link to the axle or some other portion of the running gear of the vehicle at its outer end so that it is moved up or down around the stud 5 as a pivot, when the running gears and the chassis of the vehicle move relative to each other.

A brake band 8 provided with a friction lining 9 encircles the drum 1 and is secured at one end to the brake arm 6 by means of the metal strap member 10, which is split so as to straddle the brake arm 6 and each split end secured to the studs $10^a$ which project out from each side of the brake arm. The opposite end of the brake band is provided with a hook 11 adapted to receive the end 12 of the bell crank lever 13 by means of which this end of the brake band is also secured to the brake arm.

The bell crank 13 is pivoted on the brake arm by the stud 14 and the end 15 of the bell crank is secured to the movable member of an equalizer 16 located inside the drum.

The equalizer 16, which may take various forms, in this embodiment, comprises a piston 17 pivoted to the inside wall of the drum 1 at $17^a$ and a cylinder 18 adapted to slide back and forth on the piston when the bell crank lever 13 is moved by the brake arm.

The head of the piston in this embodiment of the equalizer is provided with a small vent or valve 20 which permits the air to slowly enter or to be forced out from between the piston and cylinder when the cylinder is moved relative to the piston. To permit the air to be passed freely into or out of the cylinder when the piston moves beyond a certain point an additional vent 20ª may be provided through the wall of the cylinder in approximately the position illustrated if desired.

In the operation of the shock absorber with my equalizer attached thereto, starting from the position illustrated in Figure 1 when the vehicle strikes a bump and the running gear moves upward relative to the chasses, the brake arm 6 will be moved upward relative to the drum in a counterclockwise direction toward the position shown in Figure 2. This movement tends to unwrap the brake band 8 from the drum 1 so that it is comparatively free to slide counter-clockwise around the drum when the brake arm begins to move. The upward movement of the brake arm also causes cylinder 18 of the equalizer to slide upward on the piston 17 to compress the air in the cylinder and if the movement of the arm is of sufficient magnitude or is comparatively sudden, the vent 20 will not be able to allow for the escape of all the air trapped between the cylinder and piston and the compression of the air will therefore cause the bell crank 13 to turn in a counter-clockwise direction around the pivot 14 to draw the end 8ª of the brake band into firm contact with the drum, so as to cause a braking action, the force of which varies with the distance and suddenness of the movement of the arm 6. This braking action of the end 8ª on the drum will of course tend to check the upward movement of the running gear relative to the chassis and prevent bottoming of the springs on compressive movements of unusual violence. The force of this braking action is illustrated graphically on the diagram of Figure 4 where it is to be noted that the line Y indicating the braking action shows comparatively no braking action at the beginning of the compression but shows a sudden increase in braking action when the point X is passed beyond which a considerably greater checking action is exercised and the compression movement of the springs is quickly checked. On certain types of vehicles or for other reasons it may be desirable to omit the braking action on the compression of the springs, in which case the leverage of the bell crank 13 or the size of the vent or valve 20 could be adjusted so as to make this braking action practically negligible.

Upon the recoil of the vehicle springs the brake arm will be moved downward relative to the drum and the pressure in the cylinder 18 holding the end 8ª of the band against the drum will cause the band to wrap tightly around the drum so that the friction material 9 contacts with the entire face of the drum to cause a high braking action which will damp or snub the recoil of the springs. The braking action upon the recoil of the body is of course a component of the suddenness and force of the recoil, which depends upon the size and character of the bump and the speed of the vehicle and the amount of spring compression. These factors control the amount of movement of the band 8 around the drum, and the amount of pressure in the equalizer, which draws the end 8ª of the band into contact with the drum.

It will be readily apparent, therefore, that when the vehicle is passing over the type of bump which gives relatively slow motion to the springs, the movements of the parts of the equalizer 16 will be relatively slow and the vent 20 will function to substantially relieve the pressure so that only a sufficient braking effect to equalize the rocking motion and to prevent synchronizing when the spring action is exerted. On the other hand, when the vehicle travelling at a high speed suddenly strikes a comparatively small bump, or when travelling at lower speed strikes an abrupt bump of sufficient size, the movement of the running gear relative to the chassis in the first case will be rapid, and in the second case the amount of compression in the springs will be relatively great, so that in either event the vent 20 will not be able to relieve the pressure in the equalizer, the end 8ª will be drawn firmly into contact with the drum and a high braking action will result both toward the end of the compression movement and on the rebound, it being understood that the equalizer may be constructed, if desired, so as to give only a negligible braking action on the compression movement. When the road is only slightly uneven, as in the case of comparatively smooth cobblestone or brick roads, the movement of the cylinder 18 on the piston 17 will be so small that the vent 20 will practically relieve all pressure and the springs will absorb the bumps without being affected by the shock absorber.

For movements of the running gear relative to the chassis which are between the extreme movements above outlined, the braking action of the shock absorber will be varied by the equalizer so that substantially equalized snubbing will result throughout the entire range of compression and recoil of the springs. In other words, for the very small bumps or irregularity in the road surface or the type of bump which gives a slow and easy movement to the springs, the normal spring action prevails, for large or sudden bumps a high braking action comes into play toward the end of the compression movement as indicated on the curve Y of Figure 4 and an initially high braking action checks the recoil, while between the extremes the force of the braking action is automatically varied by the equalizer in accordance with the speed and amount of the compression or rebound of the springs so that the vehicle will ride with substantially the same degree of smoothness on any type of road and at any speed because of the equalized effect of the shock absorber.

In a similar way, the present form of shock absorber serves to cushion the movement of the chassis relative to the running gear when the vehicle strikes a hole or the like, and the wheels and running gear drop down more rapidly than the body to cause the springs to expand beyond normal. In this event the arm 6 will move downward relative to the drum from the position shown in Figure 1 and as there is no compression in the equalizer the brake band 8 is substantially free to slide in a clockwise direction around the drum to permit the springs to expand beyond normal. The movement of the arm downward will, however, draw the cylinder 18 downward on the piston 17 and increase the distance between them so as to form a partial vacuum, and air will be drawn in through the valve or vent 20 or if the expansion is great enough through the vent 20$^a$ also, so that when the body of the vehicle begins to settle down upon the springs and the arm 6 again begins to ascend the increased amount of air between the piston 17 and cylinder 18 will be compressed and will turn the bell crank 13 counter-clockwise about its pivot 14 to draw the end 8$^a$ of the brake band firmly against the drum and increase the braking effect, thus cushioning and softening the settling of the body on the springs. If, however, the settling of the body on the springs compresses the springs sufficient to cause a rebound the increased pressure in the equalizer 16 will cause the end 8$^a$ of the band 8 to be held firmly against the drum, to wrap the band around the drum and cause an initially high braking action which will quickly check the rebound as previously described.

Another important feature of my equalizer is the fact that by its use the shock absorber will automatically adjust itself in differences in the weight of the vehicle body and its contents so as to give an equalized braking effect to the shock absorber, and therefore correct riding qualities whether the vehicle is empty or full. Assuming, for example, that Figure 1 illustrates the position of the arm 6 and cylinder 18 when the vehicle is empty, it is obvious that the effects of the shock absorber on the spring action will be such as has been described. If now the vehicle is loaded to its full capacity the body will move downward due to the resiliency of the springs and the arm 6 will move upward relative to the drum moving the band 8 counter-clockwise around the drum, the cylinder 18 of the equalizer will be moved upward on the piston 17 and will remain in that position as long as the load remains on the vehicle so that the vent 20 will have time in which to relieve the pressure in the equalizer.

In this new position of the shock absorber, equalizer, etc., under full load, the springs of the vehicle are under a steady compressive force, and are sagged from their no load position so that their compression and rebound when the vehicle strikes a bump is not so great as it was under no load conditions, also the change of position of the cylinder 18 on the piston 17 has reduced the volume of air in the equalizer so that if the vehicle now strikes a bump the movement of the springs will not be so great as under no load conditions, and as the volume of air in the equalizer is also reduced, the ratio of compression is lessened and the braking or snubbing effect will be reduced. In a similar way for a load anywhere between the no load and full load, the action of the shock absorber is equalized to the action of the springs, so that the vehicle has correct riding qualities when either empty or full, and the difference between the riding of a loaded vehicle and a substantially empty vehicle equipped with an ordinary shock absorber is practically removed by the use of my equalizer.

Figure 5 illustrates how the principles of the equalizer may be applied to a shock absorber B of the hydraulic type, and for the purpose of illustration the equalizer has been illustrated in connection with the shock absorber shown in the patent to Ralph M. Lovejoy, No. 1,324,913, granted December 16, 1919, but it is to be understood that the equalizer may be applied to any other form of shock absorber.

The construction and operation of this form of shock absorber is clearly described in this patent and need not be repeated in detail here. This form of shock absorber comprises a suitable casing 30 containing the fluid 31 which may be oil, water or the like. A shaft 32 extends through the casing and projects at one end beyond the walls thereof and is provided outside the casing with an arm, which is connected to the running gears of the vehicle by means of a flexible connection, the casing 30 being connected to the chassis by means of the lugs 30'. Inside the casing a lever 33 is secured to the shaft 32 by means of a locking pin 34. One end of the lever is secured to the piston 35 of the hydraulic cylinder 36, and the other end of the lever is connected to the cylinder 18' of the equalizer 16'. A spring 37 urges the piston 35 upward against the lever 33 so that the arm on the shaft 32 is kept in the highest position permitted by the means connecting it to the running gears.

In the operation of this form of shock absorber when the vehicle strikes a bump and the running gears move upward relative to the chassis, the connection between the arm on the shaft 32 and the running gears is slackened and the shaft 32 under the influence of the spring 37 urging the piston 35 upward is turned counter-clockwise. The movement of the piston upward in the cylinder 36 opens the valve 38 in the bottom of the cylinder and sucks in the liquid 31 to completely fill the cylinder so that when the shaft 32 is turned in a clockwise direction by the pull on the arm when the springs recoil to force the piston 35 down into the cylinder 36 the valve 38 is closed and the escape of the oil is opposed by the valve 39 closing the opening 40 from the cylinder so that the recoil is snubbed or checked as fully described in said patent to Lovejoy above identified. In my improvement the resistance to the opening of the valve 39 comes from the piston 17' of the equalizer 16' and is transmitted through the bell crank lever 41, which pushes against a spring 42 positioned against the stop 43 on the stem of the valve 40. A stop member 44 limits the turning of the bell crank in one direction and keeps the parts of the valve 39 and of the equalizer in operating position. The pressure in the equalizer 16' results from the counter clockwise turning of the shaft 32 when the vehicle chassis moves upward and as in the embodiment of the equalizer previously described, depends upon the suddenness or distance the cylinder 18' moves on the piston 17'. A vent 20$^a$ permits slow leakage of the air trapped in the equalizer.

It will be readily apparent from the description of the operation of the embodiment of the equalizer shown in Figures 1 to 3 that when the vehicle is put under full load the shaft 32 will be permitted to rotate counter-clockwise and the cylinder 18' will be pushed down on the piston 17' to expel air through the vent 20$^a$ and reduce the volume of air normally contained in the cylinder to equalize the snubbing effect for a loaded vehicle and that in a manner similar to the equalizer 16, the equalizer 16' will provide a uniform spring action under all conditions of road, load and speed of the vehicle.

Figure 6:
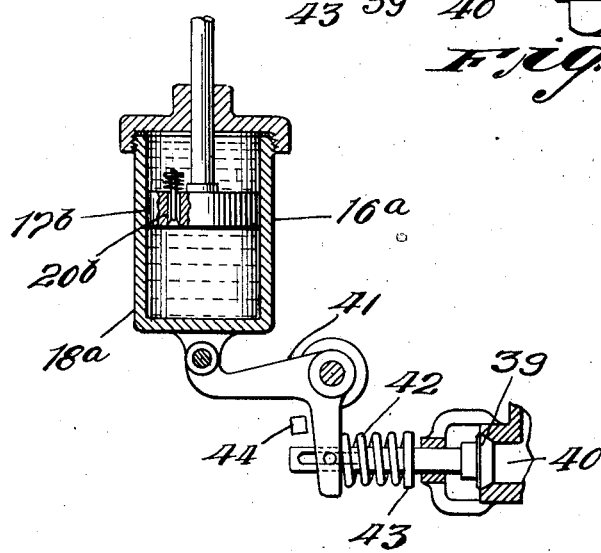
Fig. 6 is a sectional view of a different form of equalizer.

Figure 6 illustrates a hydraulic equalizer 16$^a$ comprising a piston 17$^b$ movable in a cylinder 18$^a$ and provided with a valve 20$^b$ to permit the flow of the liquid from one side of the piston to the other, and arranged to permit relatively rapid flow in one direction, while flow in the other direction is checked to insure a greater snubbing effect on the rebound of the vehicle springs than on the compression thereof.

Referring the equalizer shown in Figure 6 to the shock absorber shown in Figure 5, the operation of the same will be readily understood.

To permit the shock absorber to be applied to vehicles of different weight or with different distances between the chassis and running gear, the means for connecting the end of the arm 6 to the running gear may be made adjustable so as to hold the arm normally in horizontal position when the shock absorber is applied and means may be provided if desired to take or expand the brake band 8 to adjust the diameter of the band relative to the drum, to vary the braking effect.

In compliance with the patent statutes a preferred form of embodiment of my equalizer has been described and illustrated. It is to be understood, however, that the invention is not limited to these embodiments, but that various modifications and changes can be made therefrom without departing from the spirit of the invention or the scope of the appended claims.

We claim—

1. The combination with a shock absorber, of an equalizer, including means to store up power to increase the snubbing effect of the shock absorber on sudden and large movements of the vehicle springs, and means to prevent the storing of power on slow and slight movements of the vehicle springs and to permit slow dissipation of the power, said means comprising an apertured piston and cylinder embracing it.

2. The combination with a shock absorber for vehicles, of an equalizer comprising a relatively movable cylinder and piston, means to move the cylinder and piston relative to each other when the springs of the vehicle are compressed to store up pressure in the cylinder and means to vary the amount of pressure in accordance with the speed or amount of the compression.

3. The combination with a shock absorber for vehicles, of an equalizer comprising a relatively movable cylinder and piston, means to move the cylinder and piston relative to each other when the springs of the vehicle are compressed to store up pressure in the cylinder and means to vary the amount of pressure in accordance with the speed or amount of the compression and to permit slow dissipation of the pressure.

4. The combination with a shock absorber for vehicles, of an equalizer, comprising a relatively movable cylinder and piston, means to store up pressure between the cylinder and piston when the springs are compressed suddenly to cause a snubbing effect on the movement of the vehicle springs, and means to change the relative position of the piston and cylinder when the distance between the chassis and running gear of the vehicle is changed by variations in the load on the vehicle and to dissipate the pressure therein caused by said change.

5. The combination with a shock absorber of a snubbing means and means for automatically adjusting said snubbing means so that it will develop a snubbing effect directly proportionate to the speed or proportionate to the distance of the spring reaction in all positions of the chassis relative to the running gear.

6. In a shock absorber, a brake drum, a brake band and a brake arm, means to connect one end of the brake band to the arm and pivotal means inside the drum and extending outside of the drum including an equalizer having means to store up power and dissipate such power gradually to connect the other end of the band to the arm.

7. In a shock absorber, a brake drum, a brake band and a brake arm, means to connect one end of the brake band to the brake arm, and means to connect the other end of the brake band to the arm including a lever pivoted on the arm, means to connect one end of the band to the lever and a dash pot connecting the other end of the lever to the brake drum.

8. In a shock absorber, the combination of a brake drum, a brake arm pivoted inside the drum and extending through the wall thereof, a brake band around the drum, means connecting one end of the band to the brake arm, a bell crank lever pivoted on the arm, means to connect one end of the bell crank lever to the other end of the brake band and a dash pot connecting the other end of the bell crank to the brake drum.

9. In a shock absorber of the type described, the combination of a brake drum, a brake band and a brake arm, means to move the band on the drum to cause a snubbing action when the spring is compressed or rebounds and means to shift the position of the brake band on the drum in accordance with changes in the weight of the contents of the vehicle.

10. In a shock absorber of the type described, a brake drum and a brake band, means to loosen one end of the band and move it around the drum on compression of the springs, and fluid pressure means to tighten the other end of the band on the drum to cause the band on the drum to cause a slight braking action on the compression stroke and to hold said end against the drum to cause the band to contact firmly with the drum to exert a high breaking action on the rebound of the spring.

11. In a shock absorber of the type described, a snubbing device, an auxiliary control device thereon comprising a dash pot, a cylinder and piston movable relative to each other when the body of the vehicle moves relative to the running gears thereof and automatic means to relieve the pressure in the dash pot when the space betwen the vehicle body and running gears is permanently changed.

12. The combination with a shock absorber for vehicles, of an equalizer comprising a relatively movable piston and cylinder, means to move the cylinder relative to the piston on compression of the springs to store up pressure to increase the snubbing effect of the shock absorber and means to permit slow dissipation of the power.

13. The combination with a shock absorber for vehicles of an equalizer, said equalizer comprising a relatively movable cylinder and piston member, means to move one of said members relative to the other to store up a pressure therebetween to snub the rebound of the vehicle springs, and means to neutralize the pressure when the relative position of the chassis and running gear of the vehicle is changed due to a change in the load on the vehicle.

In testimony whereof we have affixed our signatures to this specification.

WALDEMAR VERNET.
SERGIUS VERNET.